Figure 1:
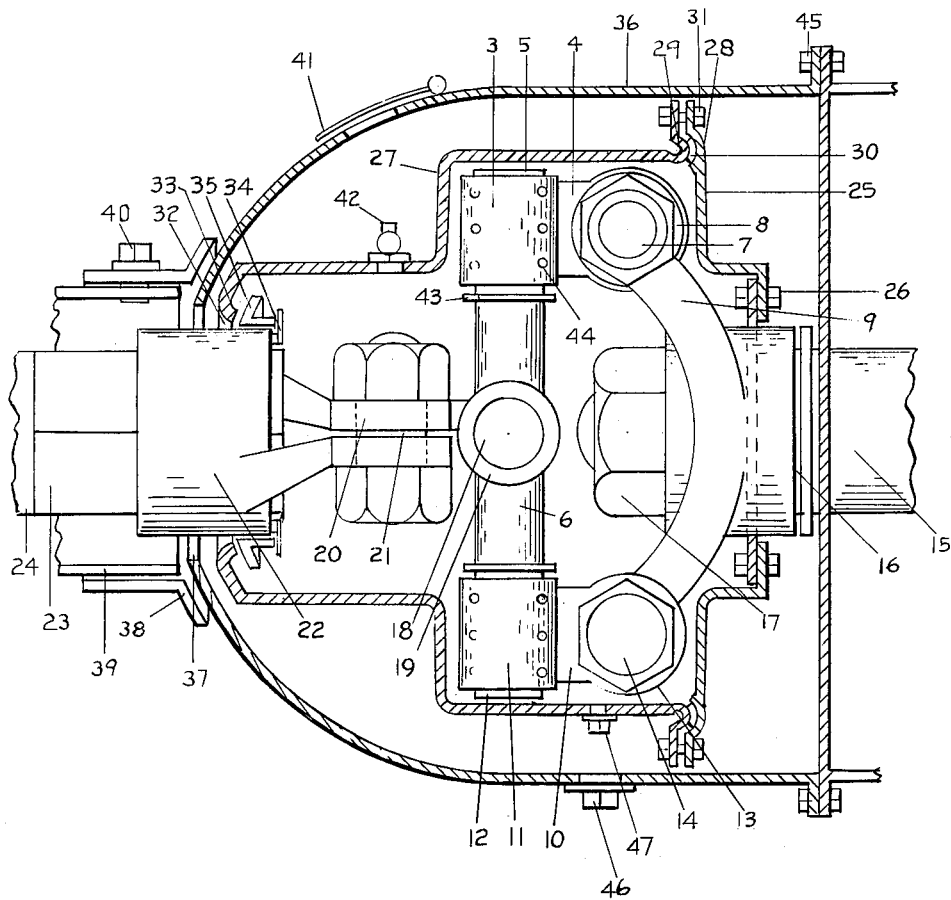

Dec. 14, 1965   J. BARLETTA   3,222,887
CASING FOR UNIVERSAL JOINTS
Filed March 5, 1962   2 Sheets-Sheet 1

John Barletta   INVENTOR.
BY

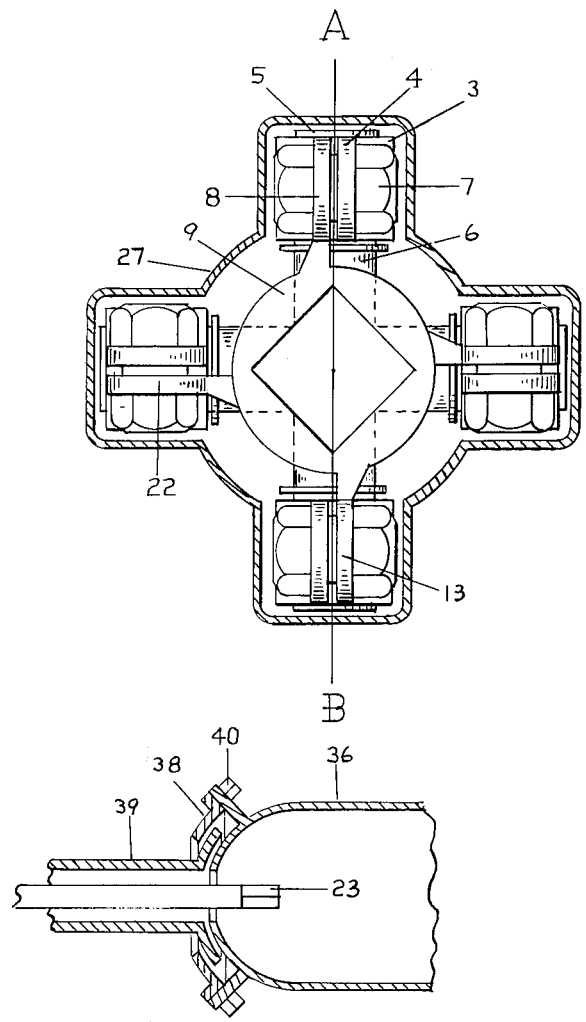

United States Patent Office 3,222,887
Patented Dec. 14, 1965

3,222,887
CASING FOR UNIVERSAL JOINTS
John Barletta, General Delivery, Alameda, Calif.
Filed Mar. 5, 1962, Ser. No. 177,942
1 Claim. (Cl. 64—32)

The invention relates to power drive universal joints, in conjunction with means of operandi, for the lubrication of the moving joint bearings which are radially spaced from the center of the universal joint axis. This invention is particularly useful in the drive mechanism of automobiles.

In the structure of motor vehicles, the height plane of the power drive axis with the rear wheel axis are not in equal plane. The lack of alignment forms an inoperable rotatable connection between the rear wheel drive axis and power drive axis. The connection made further impossible by the vehicle's movement upon the springs.

The inclusion of the universal joint on the rear wheel drive shaft for the transfer of motive power is necessary to cope with the unequal plane and with the vehicle movement upon the springs.

Heretofore, universal joint bearings radially spaced from the joint axis center, are often devoid of lubrication because the speedy rotation of the power drive slings the lubricant out of the bearing joints.

Joint bearings turning without lubrication during power drive burden will heat cut, stick, grind and wear in advance of the durable time allotted to such bearing joints and in time become inoperable.

An object of the invention is to force, without escape, the lubricant grease through the bearing joints by centrifugal force in a continuous lubricant current, the lubricant being supplied from a large size tank enclosing the universal joint.

A further object of the invention is to provide a new form of universal joint which is demountable in the parts subject to unusual wear. The accessibility of the construction form permits replacement of worn parts without dissembling other parts of the automobile.

Drawing FIG. 1 illustrates the rotational enclosure case, wherein can be seen the parts assemblage forming the universal joint unit.

The drawing FIG. 2 illustrates the structure simplicity of the toggle hub and lever form, showing the quadruple connector and the central axis alignment connection line A–B with the tubular bearing on one side of the line and the toggles on the opposite side of the line.

The view drawing 3 shows a thrust bearing in universal movement connection with the shaft safety cover tube.

The view drawing 4 shows a simplified seal joint connection for the rotational case sides.

In drawing FIG. 1 the retractile tubular bearing indicated 3, of which there are four in number, has an offset base extendant 4. The bore through the base extendant forms the attach-detachable connection. The tubular bearing oscillates on radial end pivot 5 of the quadruple connector 6 and bolt 7 secures rigidly and detachable the base extendant 4 of the tubular bearing 3 to the outer end side 8 of drive hub toggle 9.

Positioned at the opposite axis side end of the drive hub of toggle 9 the base extendant 10 projects offset from the retractile tubular bearing 11 which is mounted on end pivot 12. Bolt 14 detachably secures the base extendant 10 with the opposite side end 13 through a bolt bore in lever end 13 of drive toggle 9.

A stationary bearing in the transmission of the automotive vehicle rotatably supports the power shaft 15. The hub of toggle 9 is formed with a square drive bore connection and mounted on the square drive end 16 of shaft 15 adjacent a concentric rotational buttress wall with nut 17 setting the toggle hub against the wall rigidly secured and detachably connected.

The cross-trunnion quadruple connector 6 has four end pivot bearings spaced in 90 degree relation around its axis with the vertically positioned radial end pivot 5, shown in FIG. 1, on one side of the axis of shaft 15 and the radial end pivot bearing 12 on the opposite axis side. In horizontal relation with the vertical pivot 5 is the radial pivot end bearing 18 and tubular bearing 19, from which projects offset the lineal base extendant 20. The bolt 21 detachably connects the lineal base extendant 20 on one side of the driven toggle 22 through the bolt bore formed in the lever end of the toggle side. At the opposite side of driven toggle 22 the toggle is connected with the lineal base extendant as described for side 8 of drive toggle 9. The toggle 22 is formed with a square drive bore and mounted on square end 23 of rear power drive axle 24 to form a slidable joint connector to operate with the rise and lowering of the vehicle upon springs for usual automotive construction.

FIG. 2 shows the simplified rugged structure and connections between the lineal base extendants, and the toggle sides, the accessibility for the manual attachment and the detachment of the four retractile tubular bearings of the two toggles with the quadruple connector.

The centrifugal universal joint cover case is made of sheet metal with the drive case side 25 covering one side of the universal joint and bolts 26, secures the side 25 on to the collar surrounding hub of toggle 9 to form a fluid tight rotatable connection with the universal joint. The driven case end side 27 is secured to side 25 by a fluid tight connection comprising a concave circular groove 28 formed in side 25. A convex circular projection 29 is formed on one end of side 27 and a tin, lead or other metal washer 30 in the groove 28. The bolt 31 secures in demountable connection one side with the other side to resist lubricant loss through bolt bores set across the periphery in greater radius than of the groove.

FIGURE 4 shows a simplified radial extending flange connection with the same numerals indicating like parts. To resist loss of lubricant by centrifugal force during rotation, projection 29 extends from case side 27 into groove 28 on the surface of case side 25, and bolts 31 secure together in a demountable connection the peripheral edges of the side cases 25 and 27 with a lead washer 30 or of suitable metal received in groove 28 and engaging projection 29. To assist in the assembly of the driven case to connect with drive case a flange extends from driven case 27 over drive disk side 25 as shown in FIG. 4.

The shape of the supply lubricant storage tank case 27 is generally cylindrical or can be formed tapered from each end toward case center if desired. From the case periphery projects four universal joint bearing enclosures in fluid connection with the interior of the case. The extended enclosure chamber revolving in greater radius than the cylindrical lubricant storage case part facilitates the flow of the lubricant stream, during rotation, from the tank into the restricted enclosure pressure chambers.

The spherically shaped driven cylindrical part end of the case 27 has a greater diameter in comparison to circular opening 32 for the hub part 22 of the universal joint. The case end 27 forms a lubricant storage and when filled with sufficient lubricant, the lubricant forms into a tubular shape during rotation. During rotation the centrifugal force slings the lubricant supply against the solid inner circular wall case area with pressure and away from the inward turned curved curvatures around opening 32 at end of case 27. When the cylindrical tank is filled with sufficient lubricant, the opening 32 curved inward around opening returns into the tank any lubricant tending to splash out.

For the further lubricant spill prevention upon roadways a spring 34, secured to the toggle 22, presses the radius valve 35, slidably mounted on toggle 22, against the spherical curvature 33 at edge of case end 27. The valve 35 in contact with curvature 33 forms a lubricant tight seal and is operative with the angular movements of the rear axle shaft 24, and upon lubricant drop to the lowest side of the case in the period of inertia conducts the lubricant clear of the opening 32 into the case.

The stationary safety cover 36 is secured to the vehicle transmission and encloses the centrifugal joint lubricator case. The cover is formed with a spherical end leading from the center of the universal joint and with a power drive shaft opening 37 at the end center. End cover 38 has a similar curvature and is mounted on safety drive shaft cover tube 39. The bolt 40 secures the end cover to the safety tube.

FIG. 3 shows the safety tube 39 with the spherical shape thrust bearing part at the end operatively engaged between case end 36 and cover 38. The covers 36 and 39 are safety measure protection from rotating parts, which can be included with the centrifugal lubricator joint if so desired.

In operation, the stationary door 41 is opened manually for access to the lubricant valve 42 connected to the joint cover case.

During the revolving of the universal joint, the sling of lubricant against the circular inner wall of the storage tank driven case end 27 by centrifugal force forms the lubricant into a tubular shape at the tank wall and charges the four pressure chambers constricted syphon cases with lubricant at a pressure greater than atmospheric pressure.

The retractile tubular bearings 3 mounted on the pivot joint bearing ends extend into the constricted closure pressure chambers syphon and the lubricant in the closure pressure chambers through the inner ends of the retractile tubular bearings and through the perforations 44 efficiently lubricate the pivot joints and bearing ends with a lubricant current in constant pressure intensity by centrifugal force as the vehicle moves in traffic.

To remove the worn universal joint parts, the drive shaft tube 39 and the cover end 38 are moved to the rear. With the removal of bolts 45 of case 36 at the automobile transmission, the stationary case 36 is moved toward the rear axle and the removal of bolts 31 permits the centrifugal case 27 to be moved into case 36 and the universal joint becomes clearly visible.

If the toggles are found not to be distorted out of shape the bolts indicated 21 for toggle side 22, and bolts 7 and 14 for toggle side 9 are removed and the retractile tubular bearings and the quadruple connector drop out freely between the toggles. Further, in the event the toggles are distorted, the toggle 9 can be instantly removed by the removal of nut 17, moving the toggle toward toggle 22 until the toggle drops off shaft 15, and toggle 22 drops off shaft 24 by a manual draw toward shaft end 15. In any event thereafter, those skilled in the art can reassemble the joint parts in operable condition.

The grease lubricates the joint for a certain given number of miles. After such mileage, plugs 46 and 47 are removed and steam applied to valve 42 to remove worn grease and cleanse the centrifugal case for a recharge of grease.

For a safety measure during adjustment of parts the valve 42 for inward injection and receiving lubricant into the case and screw plug 47 are positioned in a depth cup each formed in the driven case periphery, both of which are not shown in the drawing.

The universal joint bearings being constantly lubricated prevent the mechanical cause of accidents, joint bearing friction, waste of power, undue wear of engine parts and the great waste of the country's fuel by such large number of automobiles in operation.

The description and the accompanying drawings refer to the preferred form of my invention. It is obvious to those skilled in the art that the invention is useful in motive vehicles, conforms with mechanical principles and that changes in construction, rearrangement of parts and dimension which may prove expedient fall within the scope of the appended claim.

Having thus described and illustrated my invention, what I claim as new and desire to secure by Letters Patent is:

In a universal joint lubrication assembly, a universal joint connecting drive shaft to a driven shaft, a lubricant containing casing enclosing said universal joint, a housing member surrounding said casing, said universal joint comprising a cross-trunnion member and means connecting said trunnion to said shafts, said casing concentric with the axis of rotation of the said drive shaft and comprising three portions, a first tubular portion surrounding the end of said driven shaft, a second tubular portion surrounding the end of said drive shaft and means fixedly connecting said second portion to said drive shaft in fluid tight relation, said first and second portions at one end having substantially radially inwardly directed flanges, a third portion at circumferential spaced intervals connecting said first and second portions to form spaced lubricant chambers, said third portion extending radially outwardly beyond said first and second portions and said cross trunnion positioned within said third portion and having the ends thereof extending into said chambers, sealing means between the said flange of said first portion and said driven shaft.

References Cited by the Examiner

UNITED STATES PATENTS

| | | | |
|---|---|---|---|
| 1,382,528 | 6/1921 | Miller | 64—32 |
| 1,543,575 | 6/1925 | Kishline | 64—32 |
| 1,624,262 | 4/1927 | Linley | 64—32 |
| 1,717,481 | 6/1929 | Warner | 64—32 |
| 1,808,798 | 6/1931 | Hirschel | 64—32 |
| 1,967,840 | 7/1934 | Pearce | 64—32 |
| 2,024,777 | 12/1935 | Neumann. | |
| 2,132,816 | 10/1938 | Wollner. | |

MILTON KAUFMAN, *Primary Examiner.*

KARL J. ALBRECHT, FRANK R. SUSKO, ROBERT C. RIORDON, *Examiners.*